United States Patent
Bardon et al.

(10) Patent No.: US 7,905,939 B2
(45) Date of Patent: Mar. 15, 2011

(54) BLOCK FOR FILTERING PARTICLES CONTAINED IN EXHAUST GASES OF AN INTERNAL COMBUSTION ENGINE

(75) Inventors: Sébastien Bardon, Lyons (FR); Anthony Briot, Avignon (FR); Vincent Gleize, Avignon (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 0 days.

(21) Appl. No.: 10/583,941

(22) PCT Filed: Dec. 22, 2004

(86) PCT No.: PCT/FR2004/003339
§ 371 (c)(1),
(2), (4) Date: Sep. 7, 2006

(87) PCT Pub. No.: WO2005/063462
PCT Pub. Date: Jul. 14, 2005

(65) Prior Publication Data
US 2007/0144127 A1 Jun. 28, 2007

(30) Foreign Application Priority Data
Dec. 24, 2003 (FR) .................................. 03 15390

(51) Int. Cl.
*B01D 39/14* (2006.01)
*B01D 39/06* (2006.01)
*B01D 24/00* (2006.01)

(52) U.S. Cl. ....................... 55/523; 55/522; 55/524

(58) Field of Classification Search ............. 55/522–524
See application file for complete search history.

(56) References Cited

U.S. PATENT DOCUMENTS

| 4,276,071 | A | 6/1981 | Outland | |
|---|---|---|---|---|
| 6,669,751 | B1 * | 12/2003 | Ohno et al. | 55/523 |
| 6,863,705 | B2 * | 3/2005 | Ishihara et al. | 55/523 |
| 7,112,233 | B2 * | 9/2006 | Ohno et al. | 55/523 |
| D534,264 | S * | 12/2006 | Komori et al. | D23/365 |

(Continued)

FOREIGN PATENT DOCUMENTS
EP 0 867 222 A 9/1998
(Continued)

OTHER PUBLICATIONS

EP Office Action dated Mar. 31, 2010 in corresponding 04816467.7.

*Primary Examiner* — Walter D Griffin
*Assistant Examiner* — Amber Orlando
(74) *Attorney, Agent, or Firm* — Young & Thompson

(57) ABSTRACT

A filter block, particularly for filtering particulates present in the exhaust gases of an internal combustion engine, including peripheral inlet ($50,14p_2$) and outlet ($52,14p_1$) channels arranged alternately at the periphery of the block and each including an external wall ($44;54;40_1,40_2;40_3$) exposed to the exterior of the block and an internal wall ($46;56;40_4,40_5;40_6, 40_7,40_8$) arranged inside the block. The block according to the invention is remarkable in that it includes at least one group (G) of two adjacent peripheral channels (50,52) such that, in a transverse plane of section (P), the ratio R of the average thickness "E" of all the external walls (44,54) of the group (G) to the average thickness "e" of all the internal walls (46,56) of the (G) is greater than 1.2.

19 Claims, 3 Drawing Sheets

U.S. PATENT DOCUMENTS

| | | |
|---|---|---|
| 2003/0041730 A1 | 3/2003 | Beall et al. |
| 2004/0142145 A1 | 7/2004 | Hashimoto et al. |
| 2005/0016141 A1* | 1/2005 | Hong et al. .......... 55/523 |
| 2007/0169451 A1 | 7/2007 | Bardon et al. |

FOREIGN PATENT DOCUMENTS

| | | |
|---|---|---|
| EP | 1125704 A1 | 8/2001 |
| EP | 1 142 619 A1 | 10/2001 |
| FR | 2 698 316 A | 5/1994 |
| FR | 2 829 038 A | 3/2003 |
| JP | 2002-292225 A | 10/2002 |
| JP | 2003-117322 | 4/2003 |
| WO | WO/2001/23069 * | 9/2000 |
| WO | WO 02/089979 A | 11/2002 |
| WO | 03/002231 A1 | 1/2003 |

\* cited by examiner

BLOCK FOR FILTERING PARTICLES CONTAINED IN EXHAUST GASES OF AN INTERNAL COMBUSTION ENGINE

FIELD OF THE INVENTION

The invention relates to a filter block, particularly for filtering particulates present in the exhaust gases of an internal combustion engine, comprising peripheral inlet and outlet channels arranged alternately at the periphery of said block and each comprising an external wall exposed to the exterior of said block and an internal wall arranged inside said block.

The invention also relates to a body formed by assembling a plurality of said blocks, and to a die for extruding blocks according to the invention.

DESCRIPTION OF THE RELATED ART

Conventionally, before being released to the open air, the exhaust gases may be purified by means of a particulate filter like the one shown in FIGS. 1 and 2, known in the prior art.

A particulate filter 1 is shown in FIG. 1 in transverse cross section, along the plane of section B-B shown in FIG. 2, and in FIG. 2 in longitudinal cross section along the plane of section A-A shown in FIG. 1.

The particulate filter 1 conventionally comprises at least one filter body 3, inserted in a metal housing 5. The filter body 3 results from the assembly and machining of a plurality of blocks 11, referenced 11a-11.

To fabricate a block 11, a ceramic material (cordierite, silicon carbide, etc.) is extruded to form a porous honeycomb structure. The extruded porous structure conventionally has the shape of a rectangular parallelepiped, comprising four longitudinal edges 11', extending along an axis D-D between two substantially square upstream 12 and downstream 13 faces on which a plurality of adjacent, square section, straight channels 14 terminate, parallel to the axis D-D.

After extrusion, the extruded porous structures are alternately plugged on the upstream face 12 or on the downstream face 13 by upstream 15s and downstream 15e plugs, respectively, as is well known, to form channels of the "outlet channel" 14s and "inlet channel" 14e types, respectively. At the opposite end of the outlet 14s and inlet 14e channels from the upstream 15s and downstream 15e plugs, respectively, the outlet 14s and inlet 14e channels terminate outwardly in outlet 19s and inlet 19e openings, respectively, extending on the downstream 13 and upstream 12 faces, respectively.

Each channel 14 thereby defines an internal volume 20 bounded by the side wall 22, a plug 15s or 15e, and an outwardly terminating opening 19s or 19e. The inlet 14e and outlet 14s channels are in fluid communication via their side walls 22.

The blocks 11a-11i are assembled together by bonding using seals 27 of ceramic cement generally consisting of silica and/or silicon carbide and/or aluminum nitride. The assembly thus formed can then be machined to obtain, for example, a round cross section. Thus the external blocks 11a, 11b, 11c, 11d, 11e, 11f, 11g, 11h have an external face that is rounded by machining.

This produces a cylindrical filter body 3 with axis C-C, which can be inserted into the housing 5, a peripheral seal 28, gastight to the exhaust gases, being arranged between the external filter blocks 11a-11h and the housing 5.

As indicated by the arrows shown in FIG. 2, the flow F of exhaust gases enters the filter body 3 via the openings 19e of the inlet channels 14e, passes through the filtering side walls 22 of these channels to join the outlet channels 14s, and then escapes to the exterior via the openings 19s.

After a certain period of use, the particulates, or "soot", accumulated in the inlet channels 14e of the filter body 3, impair the performance of the engine. This is why the filter body 3 must be regenerated regularly, for example every 500 kilometers. The regeneration, or "unclogging", consists in oxidizing the soot by heating it to a temperature permitting its ignition.

During the regeneration phases, the exhaust gases transport downstream all the heat energy liberated by the combustion of the soot. Moreover, since the soot is not uniformly deposited in the various channels, the combustion zones are not uniformly distributed in the filter body 3. Finally, the peripheral zones of the filter body 3 are cooled, via the metal housing 5, by the surrounding air.

As a result, the temperature differs according to the zones of the filter body 3 and does not vary uniformly. The nonuniformity of the temperatures within the filter body 3 and the differences in the nature of the materials used for the filter blocks 11a-11i on the one hand, and for the seals 27 on the other, generate high amplitude local stresses, which can cause local breakage or cracks. In particular, the local stresses at the interfaces between the blocks 11a-11h and the housing 5, and between the blocks 11a-11i and the seals 27, can cause cracks in the blocks 11a-11i thereby shortening the service life of the particulate filter 1.

SUMMARY OF THE INVENTION

It is the object of the invention to provide a novel block 11 able to decrease this risk of cracking.

This object is achieved by means of a filter block, particularly for filtering particulates present in the exhaust gases of an internal combustion engine, comprising peripheral inlet and outlet channels arranged alternately at the periphery of said block and each comprising an external wall exposed to the exterior of said block and an internal wall arranged inside said block.

The filter block according to the invention is remarkable in that it comprises at least one group of two adjacent peripheral channels such that, in a transverse plane of section, the ratio R of the average thickness "E" of all the external walls of said group to the average thickness "e" of all the internal walls of said group is greater than 1.2.

As will be seen in greater detail in the rest of the description, the average thickness of the peripheral wall formed by the external walls of the channels of said group is thus increased, thereby locally reinforcing the block and thereby advantageously limiting the risks of cracking.

At the peripheral channels that it overlaps, the peripheral wall locally has an average thickness greater than the average thickness of the internal walls of these channels. The peripheral wall thus has an "average reinforcement", which does not exclude the possibility that, over a portion of the external walls considered, for example over the width of one of said channels, or even beyond, the thickness of the peripheral wall may be less than 1.2 times the average thickness of the internal walls of these channels.

Preferably, however, in said transverse plane of section, the thickness of the external walls of the channels of said group is, at any point, greater than or equal to the average thickness "e" of all the internal walls of these channels.

More preferably, in said transverse plane of section, the ratio R* of the minimum thickness "$E_{min}$" of all the external walls of said group to the average thickness "e" of all the internal walls of said group is greater than 1.2. The cracking resistance is thereby further improved.

The invention also relates to a filter body for a particulate filter which is remarkable in that it comprises at least one filter block according to the invention.

The invention also relates to an extrusion die conformed in order to form, by extrusion of a ceramic material, a structure provided with channels suitable for the fabrication of a filter block according to the invention.

The description that follows, with reference to the drawings appended hereto, will help to better understand and appreciate the advantages of the invention. In these drawings:

Figure 4:
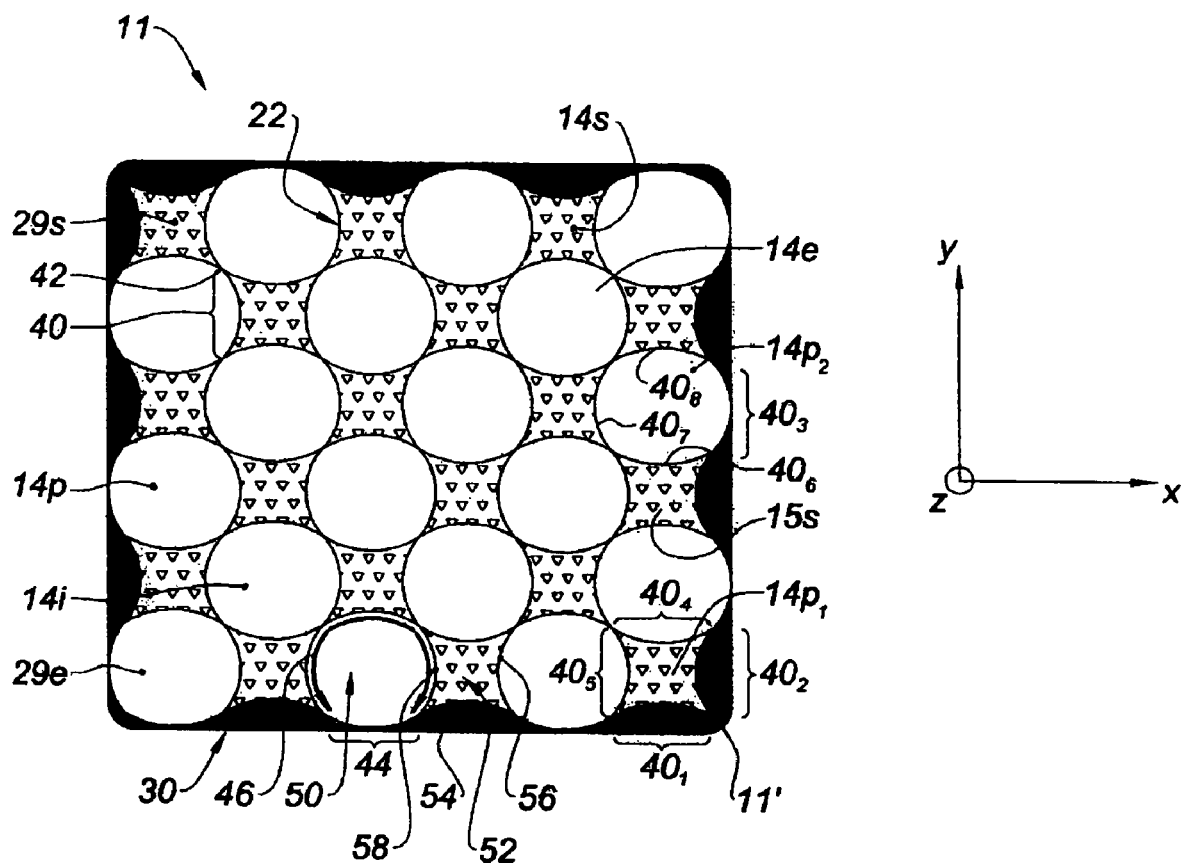
FIG. 4 schematically shows a filter block according to the invention in transverse cross section along a transverse plane P, viewed towards the downstream face of the block.
Figure 5:
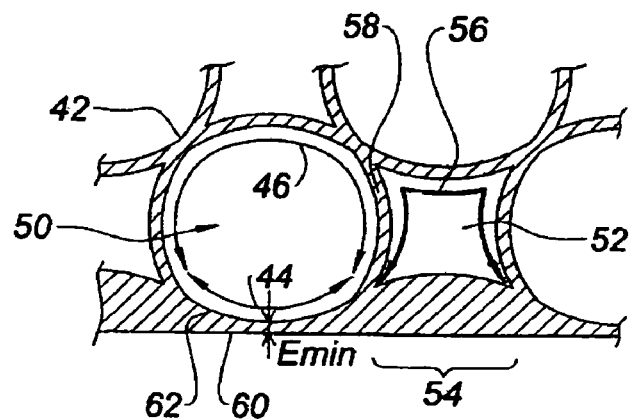
FIG. 5 shows a detail of FIG. 4.

To improve the clarity of FIG. 4, the number of channels shown is much smaller than that of the filter blocks conventionally marketed.

In these figures, which are nonlimiting, the various elements are not necessarily shown to the same scale. In particular, the thickness of the walls separating the various channels is not to scale and does not constitute a limit to the invention.

Identical references have been used in the various figures to denote identical or similar elements.

DETAILED DESCRIPTION OF THE PREFERRED EMBODIMENTS

Figure 1:
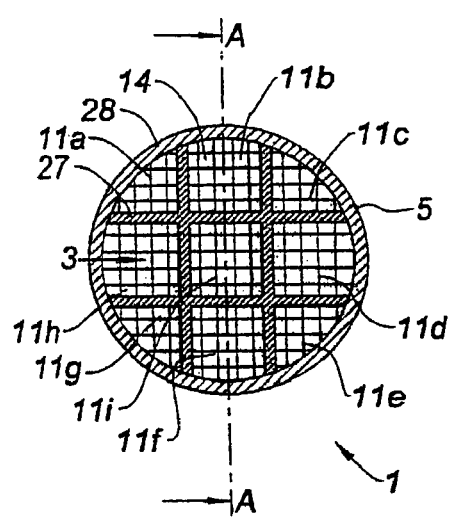
FIG. 1 shows a particulate filter of the prior art, in transverse cross section along the transverse plane of section B-B shown in FIG. 2.
Figure 2:
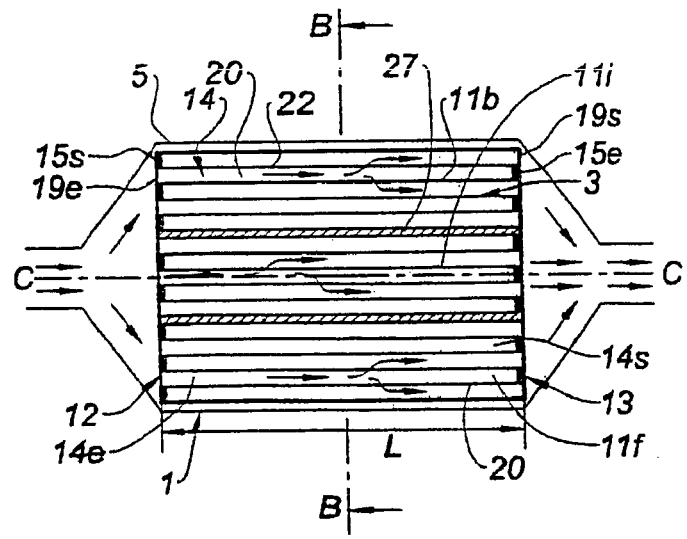
FIG. 2 shows the same particulate filter, along the longitudinal plane of section A-A shown in FIG. 1.
Figure 3:
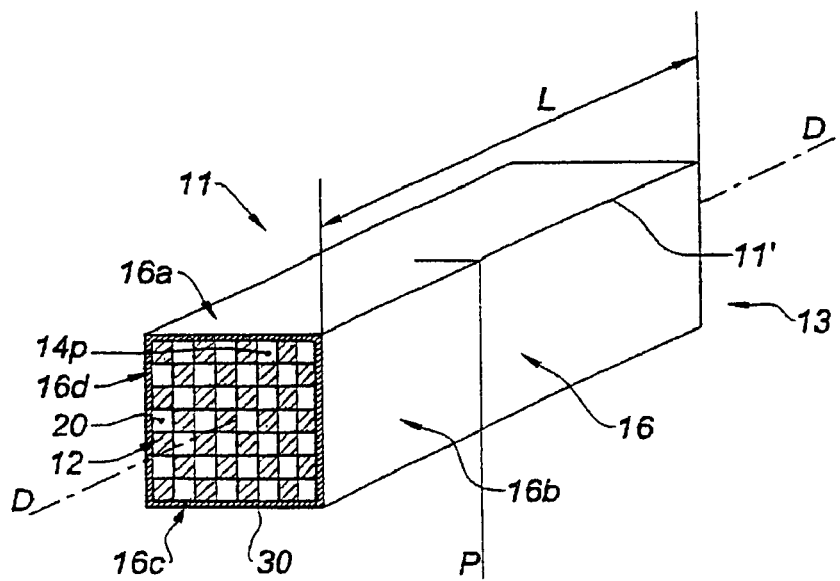
FIG. 3 shows a perspective view of a block according to the invention, in the preferred embodiment.

FIGS. 1, 2 and 3 having been described in the preamble, we shall now refer to FIG. 4, also partially described above.

The block 11 shown in detail in FIG. 4 comprises sets of adjacent inlet channels 14e and outlet channels 14s, arranged with respect to each other so that all the gas filtered by any inlet channel passes into outlet channels adjacent to said inlet channel. Advantageously, there is no zone of one or more inlet channel(s) that terminates in another inlet channel, which zone cannot be useful for filtration because the exhaust gases can pass through it in both directions. The filtration area available for a given volume of filter block is thereby optimized.

Preferably, the inlet 14e and outlet 14s channels are parallel and straight along the length L of the filter block. Advantageously, it is thereby possible by extrusion to fabricate the honeycomb structure suitable for the fabrication of a filter block according to the invention.

The sets of inlet channels 14e and outlet channels 14s are interpenetrating in order to form, in transverse cross section, a checkerboard pattern in which said inlet channels alternate with said outlet channels, in the height direction (direction y) and in the width direction (direction x).

The expression "corner channels" is applied to the inlet 29e and outlet 29s channels which bound an edge 11' of the block 11.

In any transverse plane of section, all the inlet channels 14e have an identical transverse cross section, substantially constant along the whole length L of the block. Similarly, all the outlet channels 14s have an identical transverse cross section, substantially constant along the whole length L of the block. This facilitates the fabrication of the filter blocks.

In the preferred embodiment of the invention, shown in FIG. 4, the transverse cross section of the inlet channels 14e is different from that of the outlet channels 14s. Preferably, the transverse cross sections of the inlet channels 14e are greater than those of the outlet channels 14s, in order to increase the overall volume of the inlet channels at the expense of that of the outlet channels. The soot storage capacity is thereby advantageously increased.

For this purpose, the inlet 14e and outlet 14s channels are bounded by nonplane wall elements 40, preferably concave on the inlet channel 14e side and convex on the outlet channel 14s side.

The expression "wall element" is applied to a portion of the side wall 22 of a channel bounded by splices 42. The term "splice" is applied to the boundary of a portion of side wall shared with an adjacent channel. For an internal channel, this line corresponds to a junction zone between the side walls of two channels of the same type. For a network of square section channels, the splices of one channel are therefore the "corners" of the internal volume 20.

Preferably, the wall elements 40 follow each other, in transverse cross section and along a horizontal row (along the x axis) or vertical row (along the y axis) of channels, to define a sinusoidal or "wavy" shape. The wall elements 40 undulate substantially by a sinusoid semiperiod over the width of a channel.

The expression "peripheral channels" 14p is applied to the channels located at the periphery of a block 11. The side wall 22 of the peripheral channels 14p comprises an external wall 44, that is, one in contact with the exterior of the block 11, and an internal wall 46, that is, one shared with adjacent channels. The external wall 44 comprises two ($40_1$, $40_2$) or one ($40_3$) wall element(s), according to whether the channel considered, $14p_1$ and $14p_2$ respectively, is a corner channel or not. Similarly, the internal wall 44 comprises two ($40_4$ and $40_5$) or three ($40_6$, $40_7$, $40_8$) wall element(s) respectively, according to whether the channel considered, $14p_1$ and $14p_2$ respectively, is a corner channel or not.

The external walls 44 of the peripheral channels constitute a peripheral side wall 30 forming the four faces 16a-d of the external surface 16 of the filter block 11.

Consider a group G of two adjacent peripheral channels 50 and 52. The side wall of channel 50 consists of an external wall 44 and an internal wall 46. The side wall of channel 52 consists of an external wall 54 and an internal wall 56. This group necessarily comprises an inlet channel 50 and an outlet channel 52, separated by a common wall element 58. "E" and "e" denote the average thickness of the two external walls 44 and 54 and of the two internal walls 46 and 56 of this group, respectively, measured in the transverse plane of section P. A thickness of a wall of a channel is measured by taking a position perpendicular to this wall, thereby excluding any thickness measurement in the corners of the internal volume of this channel.

R denotes the ratio E/e and R* the ratio $E_{min}/e$ of the minimum thickness "$E_{min}$" of all the external walls 44 and 54 of said group G to the average thickness "e".

According to the invention, R, and preferably R*, is greater than 1.2, preferably greater than 1.5. More preferably, the ratio R, and preferably R*, is greater than 1.9 and, preferably, less than 2.1. A ratio R, and preferably R*, substantially equal to 2, is the most preferred.

Preferably, the ratio R and/or the ratio R* is constant irrespective of said transverse plane of section P considered.

Preferably, all the possible groups G of two adjacent peripheral channels not comprising a corner channel have a ratio R or R* according to the invention, preferably identical for all these groups. More preferably, all the groups comprising a corner channel also have a ratio R or R* according to the invention, preferably identical for all these groups.

Preferably, the wall elements of the external walls of the corner channels have an identical profile to the wall elements of the external walls of the channels of the same type of the groups not comprising a corner channel.

Preferably, in the plane of section P, the average thickness of the peripheral wall of the block 11 is substantially equal to the average thickness "E" of any group G of two adjacent peripheral channels not comprising a corner channel. Preferably, the average thickness E and/or the minimum thickness $E_{min}$ is constant along the whole length L of the block.

The peripheral wall 30 of the block 11 is thus reinforced by an "average reinforcement" of material arranged uniformly on the four faces 16*a-d*, and extending along the whole length "L" of the block 11, from the upstream face 12 to the downstream face 13.

Preferably, considering a group of two adjacent peripheral channels, the average thickness of the external wall of the outlet channel is greater than the average thickness of the external wall of the inlet channel.

Preferably, the external face 60 of the external walls 44 and 54 of the peripheral channels 50 and 52 is substantially plane and the internal face 62 has the shape of a sinusoid or a fraction of sinusoid.

More preferably, the external walls of the peripheral channels are conformed so that the four faces 16*a-d* of the block 11 are plane. Advantageously, this facilitates the handling and storage of the block, which is particularly useful if the fabrication is automated.

The expression "internal channels" 14*i* is applied to the channels located inside the block 11, that is to say not comprising an external wall.

Preferably, the average reinforcement of the peripheral wall of the block is arranged so that, in any transverse plane of section P, the flow cross sections of the peripheral inlet and outlet channels 14*p* are substantially identical to those of the internal inlet and outlet channels 14*i*, respectively. Advantageously, the application of a reinforcement therefore does not alter the volumes of the peripheral channels 14*p* and therefore the overall efficiency of the filter block 11.

Preferably, the block according to the invention is one-piece and fabricated by extrusion using an appropriate die, by techniques known to a person skilled in the art. The "average reinforcement" of the peripheral wall is not added on to the filter block, but is of one piece with it. The stiffness of the filter block and its resistance to cracking are thereby advantageously improved. Furthermore, any risk of delamination of material forming the reinforcement is thereby advantageously eliminated. Finally, the fabrication of the filter block is thereby simplified.

After assembly, a set of filter blocks according to the present invention forms a structure having local reinforcements. Preferably, these reinforcements are substantially uniformly distributed.

After optional machining of this structure in order to form a filter body, a material reinforcement may be added at the periphery of the filter body. The risk of cracking is thereby further decreased.

Preferably, the assembled blocks comprise peripheral walls 30 having "average reinforcements" (that is, considering the average of the thickness of the external walls of groups of two peripheral channels) that are uniformly distributed on the external surface of the blocks.

The assembly of the blocks thereby produces an internal network of reinforcements inside the filter body, improving its resistance to cracking.

In one embodiment of the invention, all the peripheral walls 30 of all the assembled blocks have a constant thickness at least 1.2 times larger than the average thickness of the internal walls of the internal channels of these blocks. After assembly, the peripheral reinforcements of the blocks thereby form, in transverse cross section, a grid considerably enhancing the cracking resistance compared to a filter body that does not have a reinforcement at its periphery.

It is preferable for the reinforcement around the blocks to vary uniformly, preferably in a substantially sinusoidal manner, in order to increase the volume of the inlet channels compared to the volume of the outlet channels, as shown in FIG. 4.

More preferably, irrespective of the embodiment, the thickness of the internal walls 56 of the peripheral channels is identical to the thickness of the walls of the internal channels. The efficiency of filtration across all the internal walls is thereby substantially the same, irrespective of the internal wall considered.

The fabrication of the filter body is thereby also simplified, because the filter blocks can be assembled interchangeably at any position inside the filter body.

Figure 6:
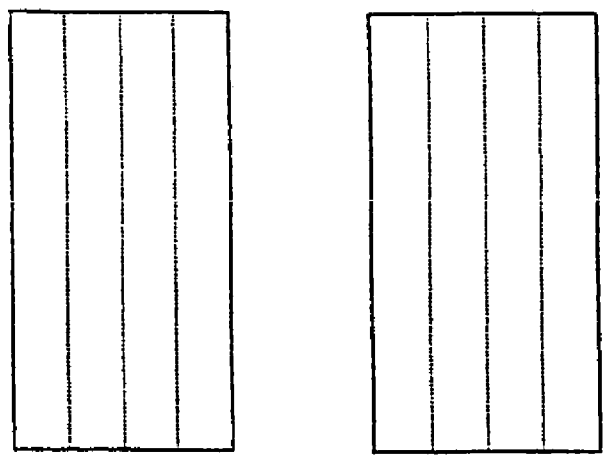
FIGS. 6 and 7 show, in plan view, longitudinal cross sections, along a median plane M as shown in FIG. 8, of filter bodies consisting of 16 blocks according to and not according to the invention, respectively, after having undergone severe regeneration tests.
Figure 7:
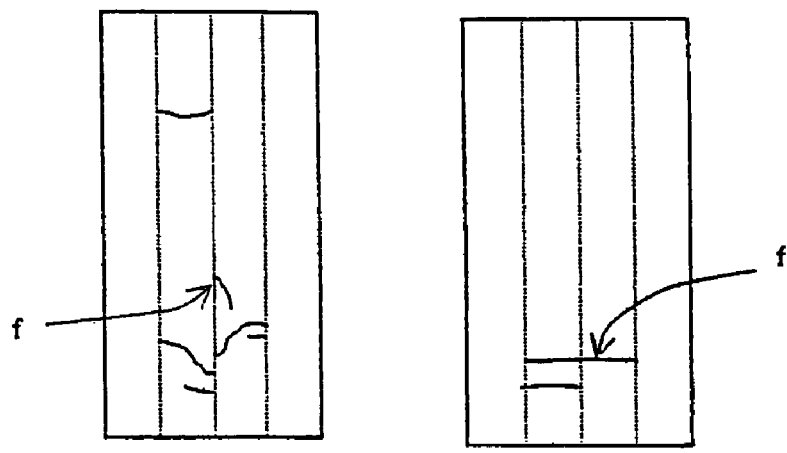
Figure 8:
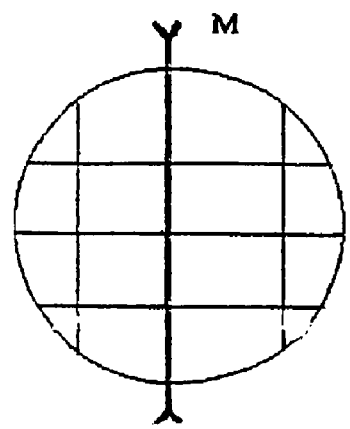
FIG. 8 shows, in transverse cross section, a filter body used for said tests.

Tests have been conducted to evaluate the cracking resistance of a filter body comprising 16 conventional filter blocks (FIG. 7) and of a filter body comprising 16 blocks of the same type but comprising, like the block shown in FIG. 4, a peripheral wall 30 reinforced according to the invention (FIG. 6). These two filter bodies were subjected to severe regeneration (corresponding to an engine speed of 120 km/hour, followed by transition to idling speed followed by post-injection) to 5 g/l on an engine test bench. The filter blocks were then cut longitudinally along a median plane. The longitudinal sections of four filter blocks are thus observed. A comparison of the longitudinal sections shown in FIGS. 6 and 7 clearly shows that the blocks according to the invention do not have any cracks, unlike the blocks according to the prior art, which have cracks "f" of a length generally greater than 0.5 mm and possibly extending along the whole length L of the block. Cracks are visible to the naked eye and under the microscope.

As is clearly apparent now, the filter block with reinforced structure according to the invention has better resistance to cracking than the blocks of the prior art.

Obviously, the present invention is not limited to the embodiment described and shown above, which is provided for illustration and is nonlimiting.

Thus, all the groups of two adjacent peripheral channels do not necessarily have the same conformation.

The reinforcement of the external walls of a group of two adjacent peripheral channels does not necessarily extend along the whole length L of the block. The reinforcement can also evolve, periodically or not, in a longitudinal or transverse plane. Advantageously, it is thereby possible to adapt the thickness of the reinforcing partition to the intensity of the local thermomechanical stresses.

The transverse cross section of a channel could also evolve, periodically or not, along this channel.

Nor do all the groups of two adjacent peripheral channels of the block comprise external walls having a reinforcement, even if this is preferable to improve the cracking resistance of the block.

Preferably, at least the groups of two adjacent peripheral channels comprising a corner channel have a reinforcement according to the invention.

The shape, particularly the cross section, dimensions and number of channels are nonlimiting. The cross section of the inlet channels could also be identical to that of the outlet channels.

The peripheral channels may also have a different cross section from the internal channels of the same type, for example because they have been truncated during the machining of the block.

The filter block 11 may have any shape.

It is also possible to arrange a reinforcement on the surface of the block 11 by fixing additional material thereon by bonding, welding or any other known technique. The material added on may be identical or different to the material of the block 11. A material reinforcement is preferably applied, after extrusion and before sintering, to those faces of the block having been machined, for example, to the rounded external faces of the blocks 11a-11b.

The method for fabricating a filter block according to the invention may thus comprise the following successive steps:

a) extrusion of a ceramic material to form a porous honeycomb structure;

b) application of a reinforcement of a material, identical or different from said ceramic material, to at least part of the external surface of said porous structure; and c) drying and sintering of said porous structure to obtain a filter block.

Optionally, the porous structure may be dried between steps a) and b), and then machined, the material reinforcement being preferably applied to at least part of said external surface having been machined.

The invention claimed is:

1. A filter body, comprising:
an assembly of a plurality of filter blocks, particularly for filtering particulates present in the exhaust gases of an internal combustion engine, at least one of said filter blocks comprising:
an inside, a periphery and an exterior;
internal inlet and outlet channels arranged alternatively in the inside of said block;
peripheral inlet ($50,14p_2$) and outlet ($52,14p_1$) channels arranged alternately at the periphery of said block and each comprising an external wall ($44;54;40_1,40_2;40_3$) exposed to the exterior of said block and an internal wall ($46;56;40_4,40_5;40_6,40_7,40_8$) arranged in the inside of said block,
the transverse cross sections of the inlet channels being greater than the transverse cross sections of the outlet channels, and
the thickness "e" of the internal walls (56) of the peripheral channels being identical to the thickness of the walls of internal channels,
at least one group (G) of two adjacent peripheral channels (50,52) such that, in a transverse plane of section (P), a ratio "R*" of a minimum thickness "$E_{min}$" of all the external walls (44,54) of said group (G) to the thickness "e" of all the internal walls (46,56) being greater than 1.2 and less than 2.1, therefore forming a reinforcement,
said reinforcement evolving, periodically or not, in a longitudinal or transverse plane.

2. The filter body as claimed in claim 1, wherein said ratio "R*", is constant irrespective of the transverse plane of section (P) considered.

3. The filter body as claimed in claim 1, wherein the transverse cross section of said inlet (50) and/or outlet (52) channel of said group (G) and/or an average thickness "E" of all external walls (44, 54) of said group (G), and said minimum thickness "$E_{min}$", is substantially constant along the whole length (L) of said block (11).

4. The filter body as claimed in claim 1, wherein said ratio "R*", is between 1.9 and 2.1.

5. The filter body as claimed in claim 1, wherein,
in any transverse plane of section (P), all said inlet channels (14e) have an identical transverse cross section, and
all said outlet channels (14s) have an identical transverse cross section,
a surface area of said transverse cross section of said inlet channels being greater than a surface area of said transverse cross section of said outlet channels.

6. The filter body as claimed in claim 1, wherein,
the inlet and outlet channels of said block are bounded by nonplane wall elements concave on the inlet channel side and convex on the outlet channel side, and
said nonplane wall elements (40) have, in transverse cross section, at least one face having the shape of a sinusoid or a fraction of sinusoid.

7. The filter body as claimed in claim 1, wherein said external walls (44,54) of said group (G) have a plane external face (60).

8. The filter body as claimed in claim 1, wherein each set of two adjacent peripheral channels of said block not comprising a channel ($14p_1$) bounding an edge (11') of said block is a said group (G).

9. The filter body as claimed in claim 1, wherein each set of two adjacent peripheral channels of said block comprising a channel bounding an edge of said block is a said group (G).

10. The filter body as claimed in claim 1, wherein, in said plane of section (P), the average thickness of a peripheral wall (30) of said block (11) is substantially equal to the average thickness "E" of the external walls of any group of two adjacent peripheral channels not comprising a corner channel.

11. The filter body as claimed in claim 1, wherein, in any transverse plane, the flow cross sections of the peripheral inlet and outlet channels ($14p$) are substantially identical to those of internal inlet and outlet channels ($14i$), respectively.

12. The filter body according to claim 1, wherein the reinforcements of said filter blocks are of one piece with said respective blocks and are substantially uniformly distributed reinforcements.

13. The filter body according to claim 1, wherein said groups (G) of adjacent peripheral channels of said filter blocks are uniformly distributed on an external surface of the blocks.

14. The filter body according to claim 1, wherein the internal walls of said peripheral channels are substantially perpendicularly connected to the external walls of said peripheral channels.

15. The filter body according to claim 1, wherein said block is parallelepiped shape.

16. A filter body, comprising:
an assembly of a plurality of filter blocks, particularly for filtering particulates present in the exhaust gases of an internal combustion engine, at least one said block comprising:
an inside, a periphery, and an exterior;
internal inlet and outlet channels arranged alternatively in the inside of said block, each channel comprising a wall;
peripheral inlet ($50,14p_2$) and outlet ($52,14p_1$) channels arranged alternately at the periphery of said block and each peripheral inlet and outlet channel comprising an external wall ($44;54;40_1,40_2;40_3$) exposed to the exterior of said block and an internal wall ($46;56;40_4,40_5;40_6,40_7,40_8$) arranged in the inside of said block,
the transverse cross-sections of the inlet channels being greater than those of the outlet channels,
the inlet and outlet channels of said block being arranged with respect to reach other with no zone of any inlet channel terminating in another inlet channel, so that all the gas filtered by any inlet channel passes into outlet channels adjacent to said inlet channel,
at least one group (G) of two adjacent peripheral channels ($50,52$) such that, in the transverse plane of section (P), a ratio "R" of an average thickness "E" of all external walls ($44,54$) of said group (G) to an average thickness "e" of all internal walls ($46,56$) of said group (G) is greater than 1.2.

17. A filter according to claim 16, wherein said block is parallelepiped shaped.

18. A filter body according to claim 16, wherein in a transverse plan of section (P), the thickness of all the internal walls of the peripheral channels is identical to the thickness of the walls of the internal channels.

19. A filter according to claim 16, wherein a ratio "R*" of a minimum thickness "$E_{min}$" of all the external walls ($44,54$) of said group (G) to the average thickness "e" of all the internal walls ($46,56$) of said group (G) is greater than 1.2.

* * * * *